Figure 1:
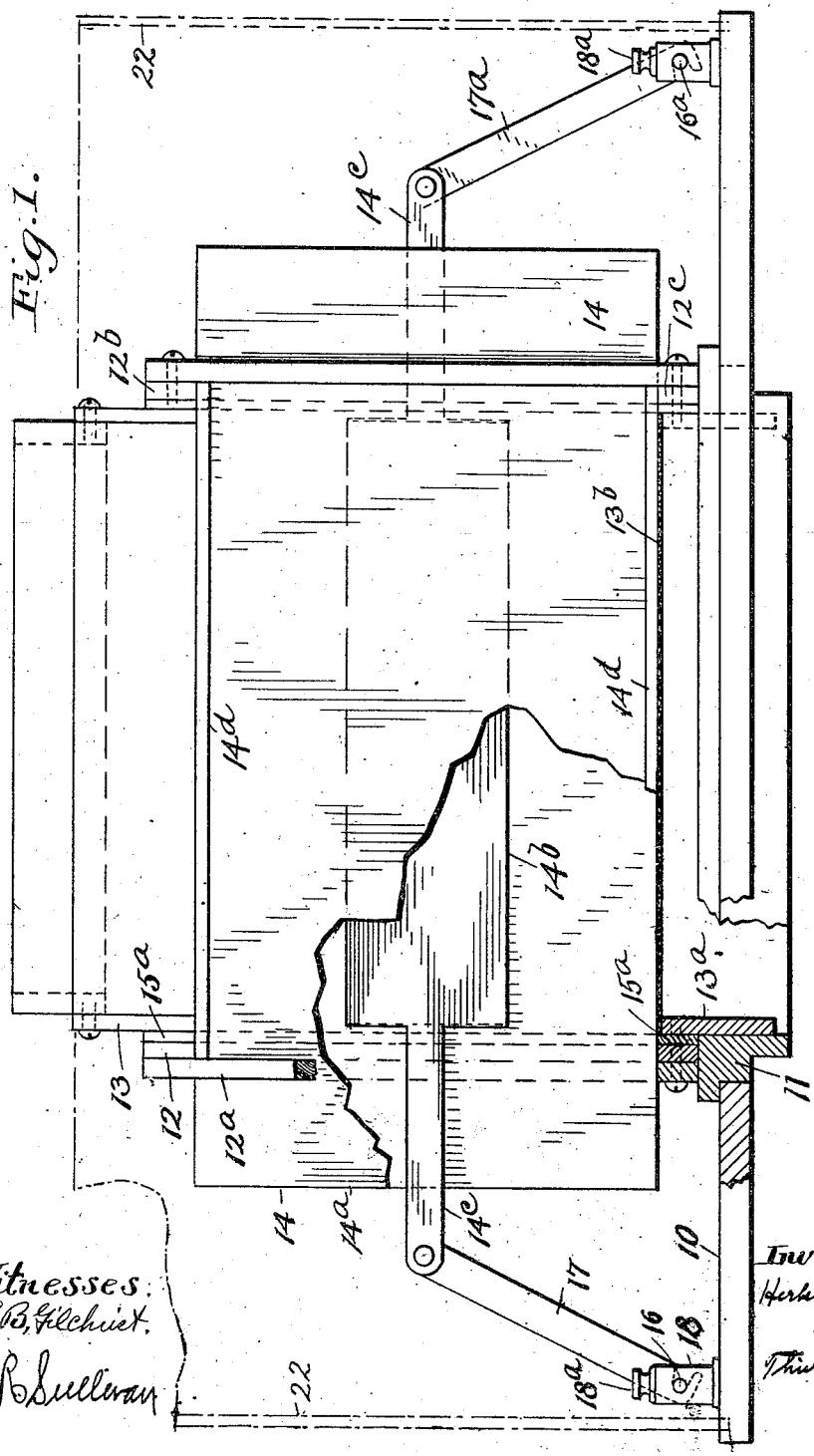

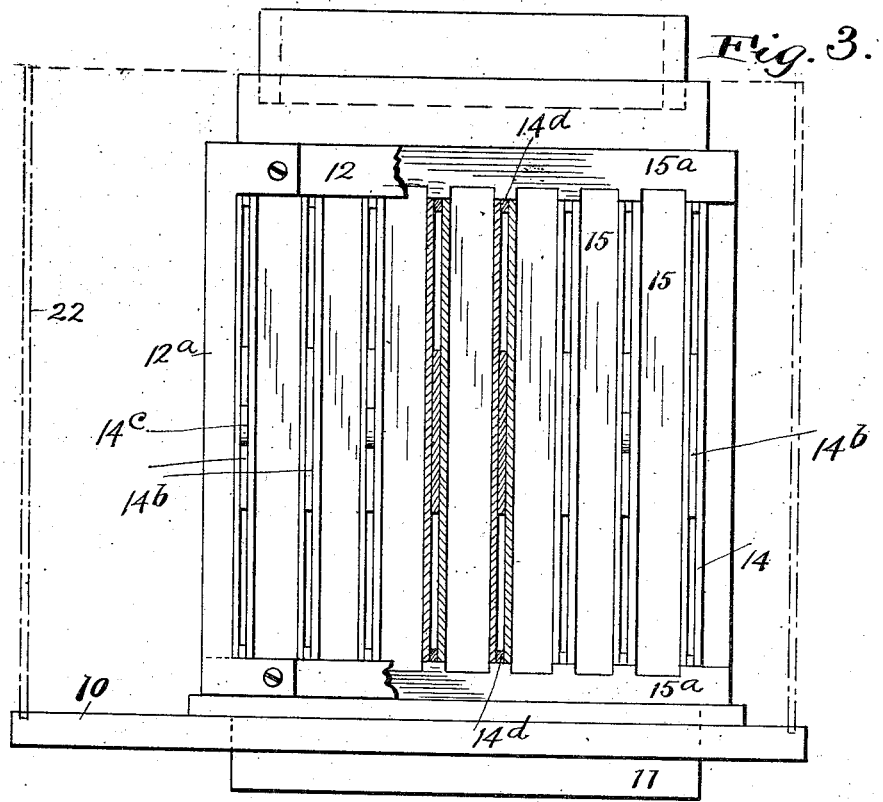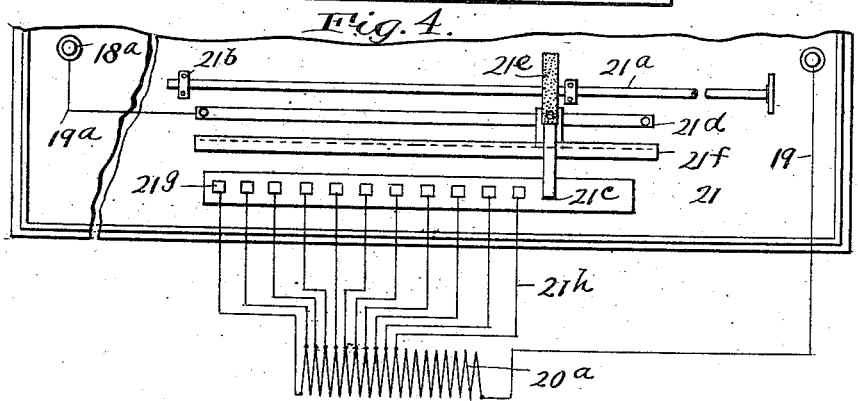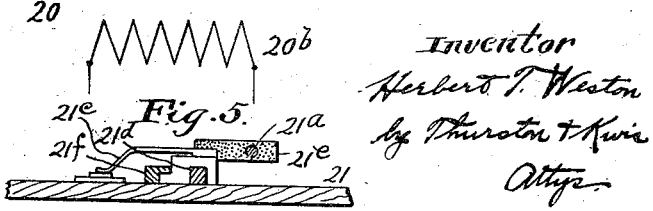

UNITED STATES PATENT OFFICE.

HERBERT T. WESTON, OF CLEVELAND, OHIO.

APPARATUS FOR TREATING FLUIDS.

1,094,618.  Specification of Letters Patent.  Patented Apr. 28, 1914.

Application filed May 1, 1911. Serial No. 624,405.

*To all whom it may concern:*

Be it known that I, HERBERT T. WESTON, a citizen of the United States, residing at Cleveland, in the county of Cuyahoga and State of Ohio, have invented a certain new and useful Improvement in Apparatus for Treating Fluids, of which the following is a full, clear, and exact description.

This invention relates to apparatus for the treatment of fluids, especially gases, by subjecting the fluid to silent discharges or other emanations produced by electricity. Apparatus of this type are generally known as ozonizers or apparatus for producing ozone, but I do not care to so describe the apparatus, for while it is eminently successful for the production of ozone, it may be used for other purposes.

Heretofore, it has generally been considered essential for the production of a successful apparatus of this type that the flat dielectrics or other members between which the static discharges take place and between which the air, oxygen or other fluid passes, be arranged very close together. It has also been thought essential that the voltage impressed on the conductors be maintained at a fairly low value, that is, very low as compared with the voltages which I find can be impressed on the conductors, if the apparatus is properly constructed. Therefore largely for these reasons, and because of fallacious theories, apparatus for the production of ozone, or for the treatment of fluids by static discharges, have been provided with very narrow spaces for the passage of fluid to be treated, and as a result, the apparatus so far produced has either been ill-suited for commercial use on a large scale or if adapted for practical commercial use, have been exceedingly bulky and expensive, and inefficient as regards the energy expended in their use. Furthermore, even with some of the best examples of apparatus of this type, a cooling or refrigeration system has been necessary to avoid an excessive rise of temperature.

By careful experiments which I have conducted, I have made certain important discoveries disproving the prior theories which for some reason or other have generally been accepted as true, and upon these discoveries, the construction of my apparatus is based, the object of the invention being to provide an apparatus of the character stated which is highly efficient, especially as compared with even the best forms of apparatus heretofore constructed; which admits of the treatment of a gas or other fluid in large volumes suitable for any commercial uses, and with a minimum expenditure of electrical energy.

Further, the invention aims to accomplish the object above stated with an apparatus which is inexpensive, occupies little space, is easy to assemble, or to disassemble in case repairs or changes are desired, and which in fact is eminently suited for almost any use to which an apparatus of this kind can be put, whether the apparatus is to be used for the treatment of fluid on a small scale, such as for laboratory use, or on an exceedingly large scale for ventilating purposes, for bleaching or disinfectant purposes, or for the treatment of air supplied to blast furnaces, in the latter case—the treatment being for the purpose of assisting in the elimination of moisture from the air, and other uses which need not be here enumerated. For example, I have discovered that the conductors and dielectrics need not be closely arranged, but on the other hand can be spaced a considerable distance apart, and at the same time the necessary intensity of emanations can be obtained by impressing on the conductors the required voltage, without subjecting the apparatus to excessive temperature rises. Thus very large spaces can be provided for the passage of fluid to be treated, and much larger volumes of the fluid can be passed through the apparatus and treated in a given time than has heretofore been possible. In fact, I find that the conductors and dielectrics of the different cells can be spaced any desired distance apart, within reasonable limits for a certain intensity of emanations, if the proper voltage is impressed on the conductors.

I find also that when the space between two dielectrics is varied, the change in voltage required to maintain the same intensity of emanations is in each case substantially proportionate to the change in the space between the dielectrics, although the percentage of change of voltage is considerably less than the percentage of change of spacing. In other words, the ratio of the increment of voltage to the former voltage is not proportionate to, and is considerably less than, the ratio of the increment of space to the former space. From this discovery, I conclude that to produce any intensity of discharge between two dielectrics separated by a given space considerable electrical energy is required to energize the dielectrics.

I have also made the further important discovery that to produce a discharge between two dielectrics across a narrow space, requires a greater expenditure of energy than is required to produce a similar discharge with a higher voltage, in excess of 20,000 volts, across a greater space. As the space between the dielectrics is increased, the voltage must be increased an amount proportionate to the extent of increase of the space, but the consumption of energy is neither constant, nor is it increased, but is in fact decreased. This can be explained by the fact that at the higher voltages which I employ, less energy is required to energize the dielectrics than at the lower voltages. I find that this rule does not seem to be true in case the discharge takes place from a conductor to a dielectric, but only when the discharge takes place between two dielectrics. In observing these phenomena, it seems that the discharge which takes place from a conductor to a dielectric is of a different character from that which takes place between two dielectrics. It is largely for these reasons, as will appear presently, that in my apparatus I employ two dielectrics separated by a conductor which is preferably at all points in direct engagement or contact with the dielectrics.

I find also that the greater the spacing of the dielectrics of the cells and the greater the voltage impressed on the conductors, the smaller the temperature rises in the apparatus. This is due to two causes. First, with the wider spacing of the dielectrics, a greater volume of fluid is treated in a unit of time than with the closer spacing, assuming that the rate of flow is constant, and consequently the refrigeration or the cooling of the apparatus, due to the fluid itself, is greatly enhanced. The second and perhaps most important reason for the smaller temperature rises at the higher voltages is that when the higher voltages are employed, there is less electrical energy consumed, and consequently less heat generated in the apparatus.

Furthermore, I find that by varying the impressed voltage, preferably by varying the secondary voltage of a transformer, I can maintain a substantially constant intensity of emanations at varying rates of flow of the fluid, which is necessary on account of the increasing of the rate of flow affecting adversely the intensity of the emanations; and as the conductivity or character of the fluid changes. For example, if air is being treated, by increasing or decreasing the voltage, as the amount of moisture in the air varies, (decreasing the voltage on an increase of moisture and vice versa), the intensity of emanations can be maintained constant. The intensity of emanations are with my apparatus capable of observation, because of the particular construction of the apparatus.

It is upon these discoveries and theories which I have proven conclusively to be true, that I have based the construction of my improved apparatus, which is shown in the drawings and described below.

Figure 2:
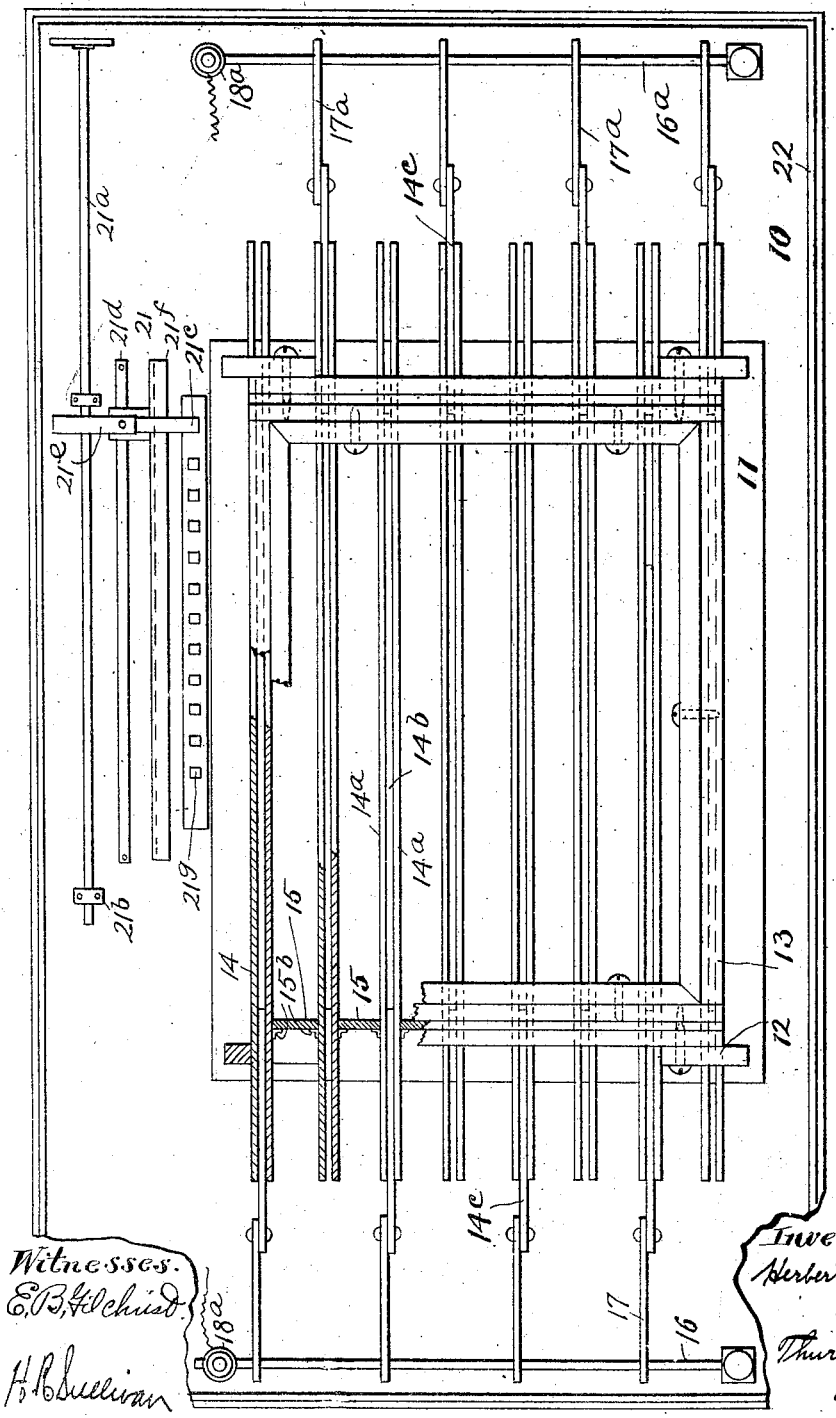

In the drawings, Figure 1 is a side elevation of my improved apparatus with parts broken away and in section; Fig. 2 is a top plan view of the same with portions broken away and in section; Fig. 3 is a partial end view and partial transverse vertical section; Fig. 4 is a conventional representation of the transformer and voltage regulator, this view showing also a part of the base of the apparatus; Fig. 5 is a detail sectional view of a portion of the voltage regulator.

In the present case, I have shown the apparatus mounted upon a horizontal base 10, and arranged so that the air or other gas treated may pass upwardly through the apparatus from the bottom to the top thereof. The base 10 has a suitable rectangular opening in which is seated a sub-base 11, which supports an oblong shaped rack 12, including vertical corner members $12^a$, upper horizontal members $12^b$ and lower horizontal members $12^c$, the latter resting on the sub-base 11. At the top of the frame and secured to it is a rectangular box-like air or fluid guide 13, and at the bottom of the frame and extending down into a suitable rectangular opening in the sub-base is a similar frame or box-like air guide $13^a$. To these air guides funnels may be attached to conduct the fluid to and from the spaces between the cells of the apparatus. Supported in this rack between the horizontal and vertical members thereof and in this case arranged in vertical or upright positions are a number of cells 14, each consisting of two flat dielectrics $14^a$, and an intermediate flat conductor $14^b$, in contact with the dielectrics at all points of its side faces, the dielectrics being preferably formed of glass and projecting beyond the conductors in all directions except at one point where the conductor has an arm or extension $14^c$ for the purpose of electric connection, this arm projecting beyond one end of the cell or beyond the two inclosing dielectrics. The dielectrics extend beyond the conductors a sufficient distance to prevent even at the highest voltages to be used, the formation of a jump spark, either from a conductor or its extension $14^c$ to a conductor or to the surface of a dielectric associated therewith. Preferably the conductors $14^b$ are fastened to the inclosing dielectrics and the dielectrics are fastened together simply by the use of a suitable adhesive. The space between the edges of the conductor and the outer edges of the two dielectrics is not hermetically sealed or closed, as I prefer that this space be open at the two ends of the cell. However, the top and bottom edges of the cell or so much of it as is located between the horizontal supporting members of the rack are sealed, as shown at 14$^d$, so as to prevent the entrance of any portion of the fluid being treated as it passes through the apparatus, and so as to prevent the escape of such fluid and to avoid any deleterious action of oxygen on the conductor employed in the cell.

The different cells are held a predetermined distance apart by means of vertical spacers 15 which are preferably made of glass and held in position by reason of the fact that their upper and lower ends are placed in suitable notches in strips 15$^a$ which extend horizontally over the top and along the bottom of the cells and are clamped between the frame and the adjacent sides of the air guides 13 and 13$^a$ at the top and bottom of the rack respectively. To prevent any of the fluid being treated from passing between the vertical edges of the spacers 15, and the adjacent surfaces of the dielectrics, the junction of each spacer and the corresponding dielectrics is sealed by vertical sealing strips 15$^b$ which may consist simply of strips of paper or cloth fastened by adhesive into the corners formed by the spacers and dielectrics. Arranged between the lower guide 13$^a$ and the fluid spaces between all the different cells is a screen 13$^b$ which is provided for the purpose of causing a uniform distribution of the fluid through all the spaces and through all parts thereof.

Preferably, the extensions 14$^c$ of the conductors of one half of the cells which are arranged alternately with respect to the other half, project beyond the dielectrics at one end of the apparatus, and the extensions of the conductors of the remaining cells project beyond the dielectrics at the opposite end of the apparatus. The conductors of one set of cells are all connected in parallel to a horizontal terminal bar 16, by means of a series of pivoted connectors 17, and the conductors of the remaining cells or of the opposite polarity are connected to a similar horizontal terminal bar 16$^a$ by pivoted connectors 17$^a$. These connectors 17 and 17$^a$ are pivoted to the ends of the extensions 14$^c$ of the conductors so that they may be swung upwardly or downwardly and at their lower or outer ends are provided with hook-shaped portions which are adapted when lowered to receive the terminal bar 16 or 16$^a$, and when swung upwardly to be disconnected from the bar so that the corresponding cells will be disconnected or put out of use. In this way, the capacity of the apparatus can be readily varied to suit requirements. The terminal bars 16 and 16$^a$ are mounted in suitable terminal posts 18, and are electrically connected by means of binding screws 18$^a$ to conductors 19 and 19$^a$ which are connected to the secondary 20$^a$ of a high voltage transformer 20 having a primary 20$^b$. Thus, it will be seen that with this apparatus so far described, one half of the conductors are electrically connected to one side of the alternating current circuit, and the remaining conductors are connected to the opposite side of the circuit.

The relation between the width of the spacers or the distance between the adjacent dielectrics of the different cells and the voltage impressed on the conductors of the cells is very important, and it is the basis of the high efficiency of the apparatus. The cells are spaced apart a great deal farther than has heretofore been thought possible, and while I do not believe it to be essential to state the exact spacing of the dielectrics or the exact voltages employed, as these values may be varied considerably when they are above certain amounts, I may state that the novel results and advantages described above are obtained when the impressed voltage is in excess of 20,000 volts and when the cells are spaced apart in proportion to the voltages used. However, the spacing and voltages are I believe limited only by the capacity of the current and voltage supplying apparatus. I may say, however, that as an example of comparative voltages, dielectric spacing and electrical energy consumed, for a given intensity of emanations and with glass dielectrics of approximately $\frac{1}{8}$ inch thickness, with a voltage of 40,000 volts, the dielectrics are spaced approximately one inch apart, and the electrical energy consumed will be approximately 24 watts per hundred square inches of dielectric surface, and that for the same intensity of emanations with a voltage of 8,000 to 12,000 volts, the dielectrics will be spaced from $\frac{3}{32}$ to $\frac{1}{8}$ of an inch apart, and the electrical energy consumed will be in excess of 50 watts for 100 square inches of dielectric surface. It will be sufficient to state, in order to form a proper basis for the subject matter to be claimed, that for a certain intensity of emanations, the spacing of the dielectrics or the width of the fluid passageways, and the voltage impressed on the conductors have a fixed relation, and the voltage which is impressed with the certain spacing of the dielectrics, is such that the actual wattage consumed in the apparatus is less than with a closer spacing, and with a smaller impressed voltage. And further, the spacing of the dielectrics and the voltage are such that a large volume of fluid may be passed through the apparatus, even at a low rate of speed, with the result that the refrigeration or cooling by the fluid itself, will be very extensive. Thus by providing very wide spaces for the passage of the fluid being treated, I produce an efficient machine of very large capacity, although of relatively small proportions, and number of cells.

To vary the intensity of emanations or to maintain a constant intensity under varying conditions of flow of the fluid treated, or in the conductivity of the fluid, such as is caused by a variation in the amount of moisture in the air, assuming that air is being treated, I employ a voltage regulator 21, shown in Fig. 4. Preferably, the transformer which I employ is provided with a series of taps extending outwardly from different points of the secondary, and by shifting the regulating handle, the effective number of turns and consequently the secondary voltage can be varied within the required limits. The voltage regulator includes a rod $21^a$ adapted to be shifted axially in suitable guides $21^b$ and provided with a movable contact member $21^c$ which is in electrical engagement with a conducting strip $21^d$, to which the conductor $18^a$, previously referred to, is connected. The contact $21^c$ is connected to the rod $21^a$ by means of an insulating member $21^e$ which is secured to the rod and is guided in its movements by the strip $21^d$, and a second strip $21^f$, parallel to the strip $21^d$. The contact $21^c$ is adapted to be moved over a series of relatively stationary contacts $21^g$ which are electrically connected to the taps $21^h$ connected to different points of the secondary $20^a$ of the transformer 20. Thus, by simply shifting the rod $21^a$ the voltage impressed on the conductors of the cells can be varied, as before stated, and for the purposes stated.

It will be understood that if it is desired to vary the intensity of emanations or to maintain a constant intensity under the varying conditions previously stated, all that is necessary to do is to vary the voltage impressed on the conductors of the cells, and at the high voltages which I employ, even though the intensity of emanations is increased by increasing the voltage, assuming that the spacing of the cells remains the same, there is but a small comparative increase in wattage consumed, so that the higher the voltage impressed, the more efficient the apparatus becomes.

Preferably, the movable or operating portions of the voltage regulator are mounted on the base 10, and preferably the transformer is arranged adjacent to the main portion of the apparatus, such as on the lower side of the base so as to avoid the necessity for long conductors carrying high voltage currents.

I may say at this point, that the apparatus is not inclosed in any casing which would interfere with the observing of the intensity of emanations. I may if desired inclose the apparatus with a glass case 22 which need not be closed at the top, or may be so if desired,—this case being merely for the purpose of preventing accident by any person coming in contact with or in too close proximity to highly charged parts or parts of high potential. The operator can, because of this construction, observe the intensity or character of the emanations or of the static discharges through the glass spacers 15, and by observing the character of the emanations or discharges, can determine whether or not the voltage should be varied.

Not only is the apparatus described above compact and very small in proportion for a given output or volume of fluid treated in a given time, but it is inexpensive and any of the parts can be readily removed in case repairs or changes are found necessary or desirable. For example, if any one of the cells should become damaged by a break or puncture of the dielectric, all that is necessary to do is to loosen the vertical seals $15^b$ and slide the defective cell out of the rack. If it is desired to use the apparatus without the one cell, all that it is necessary to do, is to place a plug into the space between the two adjacent spacers so as to prevent the escape of any fluid which is passed through the apparatus. Furthermore, as before stated, the capacity of the machine can be varied by simply swinging out of engagement with the terminal bars 16 or $16^a$ any desired number of the connectors 17 or $17^a$.

I do not desire to be confined to the exact details or arrangement shown, to the particular materials specified, nor to any particular spacing of dielectrics, or impressed voltage except to such spacing and voltage as is required to effect the saving of energy and the reduction in heat generated, as described above. Further, while I have shown one form of the apparatus which is designed for use with a confined fluid system, I wish it to be understood that the particular form and construction of the apparatus may be varied considerably in accordance with the particular purpose for which the apparatus is intended.

Having thus described my invention, what I claim is:

1. In an apparatus for the treatment of fluids by static discharges; a pair of conductors adapted to be connected to opposite sides of a high voltage electric circuit, a pair of flat dielectrics between the conductors, the dielectrics being separated by a space for the passage of fluid to be treated, the spacing of the dielectrics or the width of the fluid space being such that with an impressed voltage necessary to produce a certain intensity of emanations, there is a less expenditure of electrical energy than for the same intensity of emanations produced with a closer spacing of the dielectrics and a correspondingly lower impressed voltage.

2. In an apparatus for the treatment of fluids by static discharges, a plurality of cells each composed of a pair of flat dielectrics and a flat conductor between and in contact with the sides thereof transparent spacers separating the cells and holding the latter a predetermined distance apart, and means for supporting the cells so that the discharge can be observed through the spacers, comprising an open-ended rack.

3. In an apparatus for the treatment of fluids by static discharges, a plurality of cells each comprising a pair of flat dielectrics and a flat conductor clamped between the same, transparent spacers separating the cells and holding the same a predetermined distance apart, and means for supporting the cells so as to leave unobstructed the view of the discharge through the transparent spacers and so as to permit the removal of any of the cells, comprising an open-ended rack.

4. In an apparatus for the treatment of fluids by static discharges, a plurality of cells each consisting of a pair of flat dielectrics and a flat conductor clamped between the same and in engagement with the sides thereof, transparent spacers separating the cells and holding the same a predetermined distance apart, means sealing the junction of the spacers and cells, and means for supporting the cells so as to permit the removal of any of the latter and so as to permit the observation of the discharge through the transparent spacers comprising a rack open at two opposite sides at which the fluid enters and leaves the apparatus, and open at the ends opposite the spacers.

5. In an apparatus for the treatment of fluids by static discharges, a plurality of cells composed of flat dielectrics and conductors, the cells being spaced apart for the passage of fluid to be treated, a frame supporting the cells, the conductors each having an extension projecting outwardly beyond the associated dielectrics, a pair of terminal conductors, and connectors pivoted to said extensions and loosely engaging said terminal conductors, whereby any of the cells can be disconnected by swinging the connectors out of engagement with the conductors.

6. In an apparatus for the treatment of fluids by static discharges, a plurality of cells each consisting of a pair of flat dielectrics and a flat conductor fastened between the same and in engagement with the sides thereof, the dielectrics extending outwardly beyond the edges of the conductor a sufficient distance to avoid the occurrence of a jump spark from a conductor to a conductor or from a conductor to a dielectric, spacers between the cells for holding the latter a predetermined distance apart, means for supporting the cells comprising a rack open at two sides and at the ends, the dielectrics extending outwardly beyond the ends of the rack, means at one side of the rack for conducting fluid to be treated to the spaces between the cells, and means at the opposite side of the rack for conducting fluid away from the spaces between the cells, the junctions between the spacers and cells being sealed, and the spaces between the dielectrics of each cell being sealed along the longitudinal edges of the dielectrics.

In testimony whereof, I hereunto affix my signature in the presence of two witnesses.

HERBERT T. WESTON.

Witnesses:
H. R. SULLIVAN,
A. F. KWIS.